United States Patent [19]

Kashiwagi

[11] 4,379,724
[45] Apr. 12, 1983

[54] METHOD FOR RECLAIMING WASTE THERMOPLASTIC RESIN FILM

[75] Inventor: Hidehiro Kashiwagi, Tokushima, Japan

[73] Assignee: Taiyo Denko Kabushiki Kaisha, Tokushima, Japan

[21] Appl. No.: 293,420

[22] Filed: Aug. 14, 1981

[51] Int. Cl.³ .............................................. B08B 3/12
[52] U.S. Cl. ........................................ 134/1; 134/10; 134/25.1; 134/25.5; 134/34; 521/46.5; 521/47
[58] Field of Search ................... 134/1, 18, 25.4, 25.5, 134/34, 40, 184, 25.1, 10; 264/37; 521/46.5, 47

[56] References Cited

U.S. PATENT DOCUMENTS

| | | | |
|---|---|---|---|
| 2,845,077 | 7/1958 | Branson | 134/1 X |
| 3,222,221 | 12/1965 | Branson | 134/1 |
| 3,849,196 | 11/1974 | Halloway et al. | 134/25.5 X |
| 4,045,243 | 8/1977 | Wohlert | 134/1 |
| 4,073,661 | 2/1978 | Buzga et al. | 134/1 |
| 4,131,483 | 12/1978 | Iwahashi et al. | 134/1 |
| 4,311,157 | 1/1982 | Jubenville et al. | 134/184 X |

Primary Examiner—Marc L. Caroff
Attorney, Agent, or Firm—Flynn, Thiel, Boutell & Tanis

[57] ABSTRACT

Waste thermoplastic resin film is cleaned to reclaim raw material for subsequent recycling by crushing a mass of the waste film into pieces and then feeding the pieces onto a moving mesh conveyor immersed in a wash tank which is filled with a cleaning liquid; the liquid being at a temperature sufficient to soften the pieces. Cleaning is promoted by irradiating the pieces on the conveyor with ultrasonic energy from positions located on opposite lateral sides of and just above the upper surface of the conveyor while simultaneously forcing liquid in the tank to flow in the same direction as the conveyor while directing jets of additional liquid into the tank in the opposite direction to produce a forced circulatory flow pattern within the tank.

7 Claims, 4 Drawing Figures

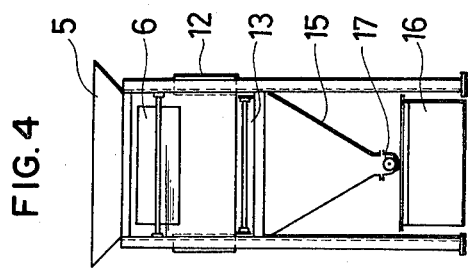
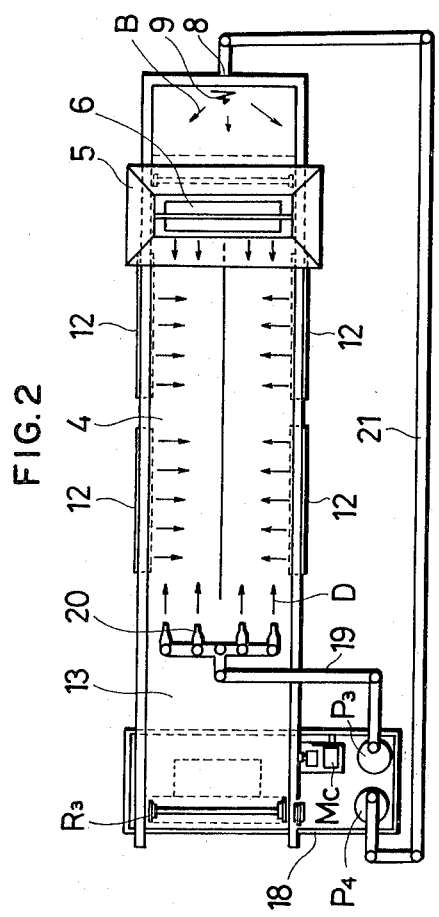
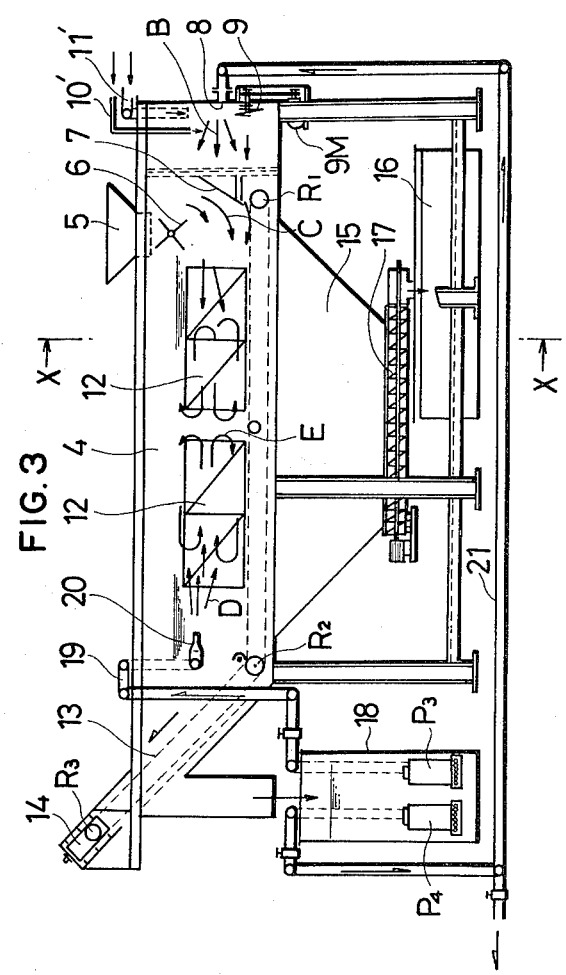

METHOD FOR RECLAIMING WASTE THERMOPLASTIC RESIN FILM

This invention relates to a method for separating out and removing extraneous matter, such as contaminants or impurities, attached to waste film made of thermoplastics, such as polyvinyl chloride, polyethylene, or the like, in order to recycle it as a raw material, and to an apparatus for carrying the method into effect.

In recent years, the problems of saving energy and resources, particularly the problem of saving and effectively utilizing petroleum or primary or secondary products made from it, have become important.

On the other hand, with the widespread use of facilities for gardening or greenhouse cultivation, which reflects the large demand for farm products of high quality, the amount of films used for agricultural purposes, the major part of which is polyvinyl chloride film, has increased steeply and accordingly, the amount of discarded films has also increased rapidly. The problem of discarding or disposal of such plastic articles, therefore, requires review or reconsideration from both of the viewpoints of energy saving and public nuisance. One of the countermeasures for solving effectively the problem is to recycle the waste.

Waste plastic film bundles recovered and collected together from farms are usually attached or mixed with foreign matter, such as soil, pebbles, wires, nails, cans, glass fragments, etc., and contaminants, such as mud, greasy stains, etc. It is therefore essential to separate out and remove in advance such extraneous matter in order to make the waste film clean for the purpose of performing effectively the subsequent steps of crushing, purification and reclaiming. The development of a method for converting effectively waste plastic films into highly purified plastic raw material is of great significance.

Treatment of waste plastic films such as polyvinyl chloride or polyethylene which are generally used for agricultural purposes and in gardening greenhouses and tunnels has been heretofore considered, and various attempts for the treatment have been made to recycle it.

A conventional method for recycling a waste film comprises first bundling waste film in a compressed bulk form, transferring the bulk material to a crushing step, crushing it into pieces of about 50 mm size with a cutter, and subsequently treating the crushed film pieces in order to separate out extraneous matter. In the step of separating extraneous matter, air bubbles are blown into a water stream from below to conduct cleaning due to agitation caused by the bubbles while beating the bulk material of film pieces, whereby to remove pebbles, nails, sand, mud, etc. The resulting film pieces are further crushed to a size of about 13 to 30 mm and then are separated into two groups of polyvinyl chloride film and polyethylene film (containing or not containing another plastic film), only the former being transferred to the next hydro-extraction, step. A centrifugal hydro-extractor which is comprised of a rotary cone and a screw adapted to revolve within the cone, is used for the water extraction. The film pieces are transferred into the middle of the cone and when subjected to centrifugal force, are pressed against the wall of the cone, whereby the water content is removed and discharged downwardly in the direction of the largest diameter of the cone. The film pieces thus hydro-extracted are scratched by means of the screw, followed by transfer to the next drying stage wherein they are dried. Thus, a final product, a so-called fluff material, is obtained. The fluff material is reusable, for example, as a raw material for molding of polyvinyl chloride pipe.

However, according to the conventional method described above, the step of separating extraneous matter is caused by the separation action based on the agitation of air in water, so that extraneous matter of higher specific gravities, such as pebbles, metal, sand, can be removed while the portion that sticks to the film surface and which have lower specific gravities, for example, sludge or mud, is difficult to remove or can be hardly removed, particularly in the case of greasy stains.

Again, the waste film pieces prior to the treatment are a little hardened because of aging. When such waste film pieces are bundled in compressed state and are piled up for storage, they are further pressed, and as a result, deformation such as creases, flutes and folds are set in them. Accordingly, such deformations are not sufficiently removed and smoothed out in water, so that it is more difficult to eliminate extraneous matter or sludge present in or attached to deformed portions. An insufficient purification degree in the washing step may not only deteriorate the quality of the final product, but also may adversely affect the subsequent steps. That is to say, in the subsequent crushing step, if the grease content remains, the edge of the crushing cutter will not cut sharply and if sludge remains, the edge will be damaged or worn rapidly. Furthermore, in the next water extraction step, if mud or sludge remains, it will be deposited or accumulate on the inner wall of the cone and as a result, the fluff will be pinched between the screw and the wall surfaces, which leads to bending and damage of the screw blades or leads to reduction in the efficiency of the hydro-extraction. Even if washing is sufficiently conducted in order to eliminate the sludge or mud in the crushing step or the polymer separation step after the cleaning step, a good result cannot be obtained.

In view of the drawbacks inherent in such prior art, the present inventor has formerly provided a method of separating and eliminating extraneous matter on a bulk material of waste film based on the findings that the aforesaid sludge or foreign matter can be eliminated completely within a very short time by the cleaning effect of ultrasonic wave energy, which effect is increased synergistically when heating is conducted simultaneously with the cleaning (Japanese Patent Published Application No. 55-159,943(1980)). That method comprises crushing a bulk material of waste film made of thermoplastic resin, immersing it into a washing or cleaning solution which is heated or maintained at such a temperature that the waste film is softened in the solution and the deformations formed on the film, such as creases or flutes, are smoothed out and substantially disappear, beating and moving the waste film pieces in the solution while fluidizing the liquid thereby to soften them and to eliminate the deformations on them, and simultaneously applying ultrasonic wave energy against the waste film pieces, thus separating out and removing extraneous matter or contaminants from the film pieces.

The method has a superior cleaning effect, to be sure, as compared with conventional methods, but is still not as effective as expected since the cleaning solution does not permeate sufficiently into the inside of the bulk material of waste film pieces. This is because the fluidization state of the stream produced in the cleaning tank when the waste film pieces are transferred and flow in one direction and the residence time of them in the tank are not enough to effect thorough cleaning, and agitation of the solution is insufficient. The former problem might be solved to some extent by making the length of the tank longer in order to increase the residence time in the cleaning tank, but the installation area of the apparatus will be too great to be practical.

In utilizing the foregoing ultrasonic wave energy, the vibrators are disposed at both sides on the bottom of the tank so that the ultrasonic wave energy may be directed obliquely upwardly from the bottom. As a consequence, even if vibration is applied to the solution, it cannot impart a sufficient beating effect to the waste film. This is considered to be another reason for the decrease in the expected cleaning effect.

Accordingly, in view of the circumstances as described above, the present invention contemplates further improving the preceding method. A primary object of this invention is to provide a method and apparatus for treating a waste film capable of exhibiting a greater cleaning effect and enhancing the treatment ability to a great extent.

According to this invention, the foregoing object has been attained by a method of treating a waste film for recycling and an apparatus therefor characterized in that ultrasonic wave energy is directed against the bulk material of waste film pieces, from both sides of it at right angles to the advancing direction of it in an opposing manner, concurrently with which a countercurrent water stream is flowed forcibly against the stream flowing in the transfer direction produced by the transfer of the waste film pieces whereby the waste film pieces have as many opportunities as possible to come into contact with a circulation stream which is produced frontward and rearward of the transfer direction thereof; and that means for purifying the waste film pieces by means of the pressure shower of a rotary screen is further added thereby improving the separation and elimination of extraneous matter.

The invention will be hereinbelow described in more detail with reference to certain preferred embodiments, in conjunction with the accompanying drawings in which:

FIG. 2 is a schematic top plan view of a cleaning tank constituting the essential parts of the invention apparatus;

FIG. 3 is a cross-sectional view in the vertical plane to the elongation direction of the cleaning tank as illustrated in FIG. 2; and FIG. 4 is a cross-sectional view taken on the line X—X of FIG. 3.

Figure 1:
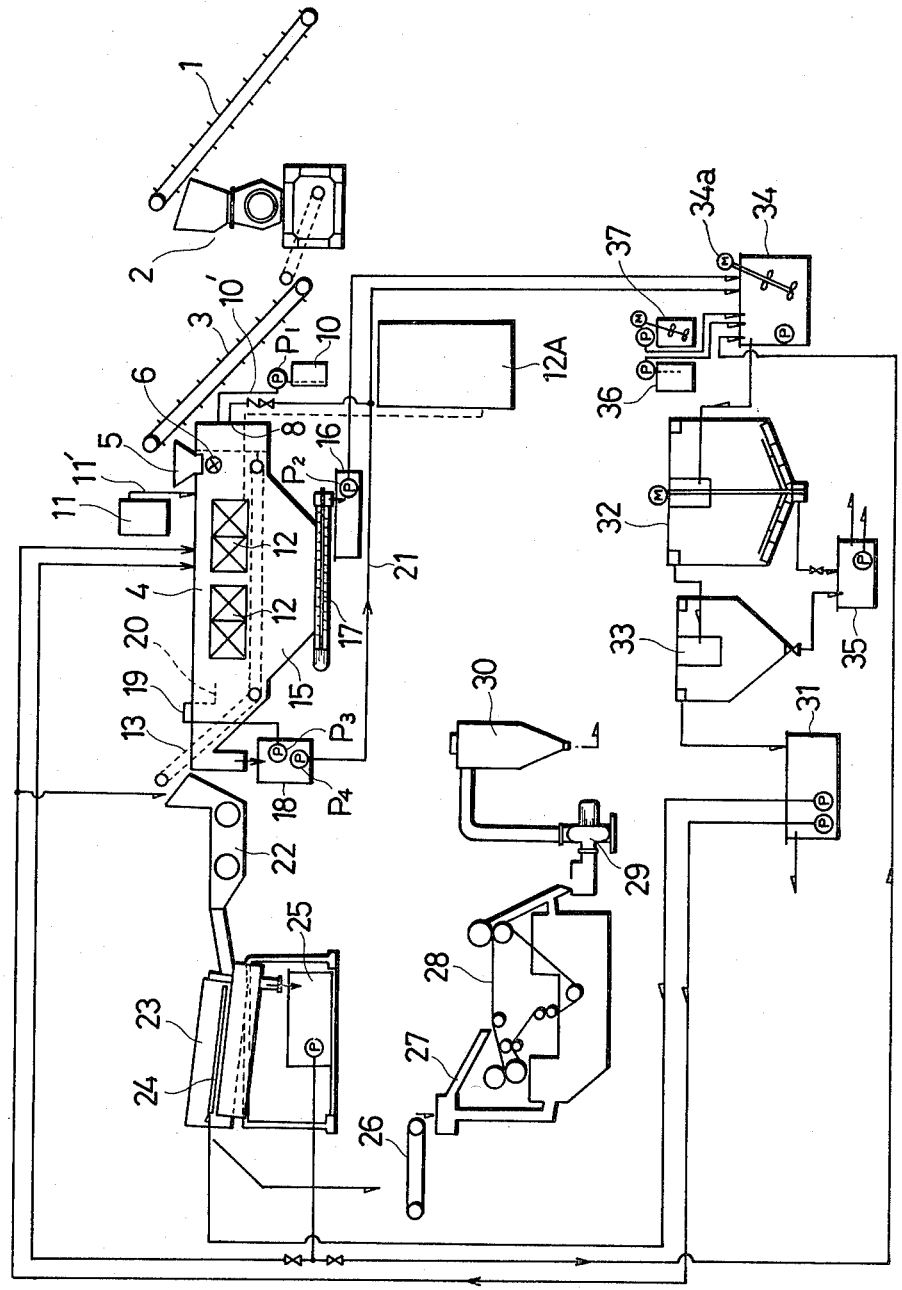
FIG. 1 is a schematic illustration of an apparatus according to this invention.

In these figures, a bulk material of waste film made of synthetic resin is fed to a crusher 2 by means of a travelling conveyor 1 and is crushed and cut by the crusher 2. Thereafter, the crushed waste film pieces are conveyed by a second conveying means 3 and are then supplied into a cleaning tank 4 from hopper 5. The first conveyor 1 is not essential, and the bulk material of waste film may be fed manually to the crusher 2. The second conveying means 3 is not limited to the conveyor as illustrated, but may be replaced with a pressure feed mechanism comprising a pressure feeder and duct hose.

The cleaning tank 4, as shown in FIGS. 1 to 3, is provided with a guide wheel 6 underneath the hopper 5. A mesh conveyor 13 having tension regulating fittings at the end thereof is provided in the tank 4 and extends from the position below the guide wheel 6 to the discharge station of the tank so that it can be driven by means of a motor Mc transmitted through rolls $R_1$, $R_2$, $R_3$. At the rearwardmost part of the tank, there is positioned an agitator 9 for impelling a liquid stream inside the tank along a guide plate 7. The agitator 9 is driven by means of a motor 9M. A feed pipe 10' for feeding a cleaning solution is coupled to a detergent supply tank 10 through pump $P_1$ and a pouring pipe 11' for pouring a heated liqud into the tank 4 is connected to a boiler 11 so as to regulate the temperature of the cleaning solution. The pipes 10' and 11' are located at the rear part of the tank and communicate with the tank, whereby they serve to prepare a cleaning solution in the cleaning tank 4. Further, a recycle pipe 21 is coupled, through a pump $P_4$, to a drainage tank 18 provided below the front end on the outlet side of the cleaning tank 4. The recycle pipe 21 communicates with the rear part of the tank at the port 8.

On both of the side walls of the cleaning tank 4, more than one pair of ultrasonic vibrators 12 (two pairs are illustrated in the drawings) are disposed in an opposing manner so that ultrasonic wave energy may be directed mutually inwardly. The vibrators 12 are joined to an ultrasonic frequency oscillator 12A which is arranged outside the tank. The oscillator 12A, when driven, serves to impart a low frequency vibration on the order of 30 KHz to the solution in the tank, whereby sludge or the like attached to the waste film is removed.

It is an essential feature of this invention that the vibrators 12 be disposed on both of the side walls of the cleaning tank in an opposing manner. As a consequence, the invention is remarkably enhanced in the cleaning effect over a system in which vibration is imparted from below.

Another essential feature of this invention resides in providing a forcible means for forcing the cleaning solution into the circulation stream in the cleaning tank. That is to say, the agitator 9 is provided at the rear part of the cleaning tank. A pipeline 19 is provided in opposing relation to the agitator and is coupled through a pump $P_3$ to the drainage tank 18 provided below and frontward of the cleaning tank 4.

The end of the pipeline 19 is formed to provide jet nozzles 20 which serve to jet water in the direction from the frontward end to the rearward end in the cleaning tank 4, namely toward the rear part of it, thus making it possible to form a countercurrent stream against the overall transfer direction of the waste film pieces.

Thus, the circulation water stream E is generated in the cleaning tank 4, as shown in FIG. 3, by a stream B produced from the reflux stream due to the agitator 9 and the reflux tube 21, a stream C produced by the guide wheel 6 and the foregoing countercurrent stream D produced by jetting from the jet nozzles 20. The circulation stream occurs and exists near the ultrasonic vibrators 12, thus enhancing the ultrasonic cleaning effect of the waste film.

Below the cleaning tank 4 there is provided a precipitation tank 15 where sludge, such as various kinds of dust and soil, sand, pebbles, iron pieces, etc. that fall down from the selvedge portions of the mesh conveyor 13 is precipitated or deposited.

A screw conveyor 17 is provided horizontally on the lower side of the precipitation tank 15 and is adapted to convey and cumulate the sludge precipitated from the discharge end of the conveyor 17 into a sludge tank 16 below it.

A pipeline system is constructed so that the sludge portion thus cumulated in the sludge tank 16 is eventually conveyed to another sludge tank through pump P$_2$ and is collected together with other sludge portions conveyed to it and cumulated.

In front of the cleaning tank 4 there is provided a purifying device for the purpose of further washing the waste film thus washed in the cleaning tank, between which device and the cleaning tank there is interposed a film-water mixing tank 22.

The purification device is typically comprised of a rotary screen 23 made of a cylindrical wire mesh and a water jet means 24 for jetting washing water onto the waste film inside the cylinder. Any source of water may generally be used for the water jet means 24. In this invention, however, the water jet means 24 is connected to a separately arranged storage tank in order to rationalize the water system of the apparatus of this invention.

The reference numeral 25 in FIG. 1 designates a drain tank provided in the purification device.

The waste film thus purified is now reclaimed on a series of mechanisms which are connected to the purifying device.

One example of the unloading mechanism, as shown in FIG. 1, comprises a conveyor 26, a guide member 27, a draining member 28, a pressure blower 29 and a cyclone 30. Ultimately, the waste film pieces are unloaded from the cyclone 30 as a dried reclaimed film material. Any known devices may be used for the respective members and may be easily designed suitably by those skilled in the art.

The apparatus of this invention as described above is attached with various kinds of water treatment devices, one embodiment of which is shown in the lower part of FIG. 1. In that figure, a storage tank 31, a first precipitation tank 32, a second precipitation tank 33 and a sludge tank 34 are provided as such devices.

Supernatant liquid in each the precipitation tanks 32, 33 is returned to the storage tank 31, from where it is fed into both the cleaning and purifying devices by means of the respective pumps for the purpose of its effective use while the precipitants are shifted from the precipitation tanks 32, 33 to a concentration tank 35 from where they are discharged through a pump or without using a pump.

The sludge content finally collected en bloc in the sludge tank 34 is gradually coagulated by a coagulating or agglomerating agent under stirring with a stirrer 34a which agent is supplied from coagulant-containing tanks 36, 37 each provided with a stirrer, if necessary.

The water treatment devices should not be limited to the constitution embodied above, but of course, may be changed or modified conveniently.

Operation for cleaning a waste film made of a synthetic resin on the series of the devices described above will now be explained.

Warm water heated by the boiler 11 is poured into the cleaning tank 4 and to this is added dropwise a suitable amount of a detergent from the detergent tank 10 whereby to prepare a cleaning solution. Additional water may be poured in, but must be heated appropriately.

The temperature of the cleaning solution at which ultrasonic cleaning is conducted cannot be determined generally, but varies depending on whether emphasis is placed on the chemical cleaning power or the physical cleaning power. Usually water is observed to have its maximum physical cleaning power at about 50° C. That is to say, the effect of ultrasonic vibration reaches its maximum at about 50° C. In this invention, however, it is preferred to conduct cleaning at 40° to 45° C. taking account of the heat-resistant temperature of the vibrator used in this invention.

The optimum liquid temperature varies depending on the kind, component and the degree of aging of the thermoplastic resin composing the waste film, the state of deformation set in the waste film, the degree of aggregation, agglutination or entanglement of a bulk material of the waste film. It is required to be such a temperature that creases, folds, flutes or the like deformations set and formed on the waste film is smoothed out and substantially disappears. For instance, the optimum liquid temperature for polyvinyl chloride is about 40° to 45° C. and that for high-pressure polyethylene is about 30° to 35° C. However, these values are not always determinative, but a preferred temperature may be determined in conformity with given conditions.

When the cleaning tank 4 is maintained at an optimum temperature in this way, a bulk material of waste film is crushed with the crusher 2 to form pieces, and the waste film pieces are sequentially introduced and fed through the hopper 5 with the aid of the guide wheel 6 into the cleaning tank. At this moment, within the tank, on the one hand, there are present water streams B and C as shown in the arrow lines in FIG. 3 cause by the action of the reflux water that overflows from the drainage tank 18 and is circulated by means of the guide wheel 6 and the action of the stirrer 9. On the other hand, there occurs the counter stream D as shown in the arrows in FIG. 3, in the frontward area in the tank owing to the jetting of water from the jet nozzles 20.

In this state, an ultrasonic frequency amplifier oscillator is actuated to generate ultrasonic wave energy of about 30 KHz through the ultrasonic vibrators 12 to the waste film pieces. The waste film pieces, when transferred riding on the mesh conveyor 13, are subjected to the action of the forced circulation stream E by the foregoing streams B, C, D, and are cleaned by ultrasonic wave energy while staying in the tank for a time sufficient to undergo an efficient cleaning.

After the waste film pieces are thus washed and cleaned for about 3 minutes within the cleaning tank 4, they are conveyed outside the tank by means of the net conveyor 13, are transferred to the water-film mixing tank 22, thereafter are purified by the pressure shower of the rotary screen 23 to finish the washing, are conveyed and passed through a series of mechanisms and are finally unloaded out of the cyclone 30.

With the treatment of drain water, the sludge that falls down from the cleaning tank 4 from the selvedge portions of the net conveyor 13, followed by accumulating in the aggregation tank 15 below the conveyor, are conveyed out by means of the screw conveyor 17 to the sludge tank 16 and subsequently are transferred to the drainage-receiving, sludge tank 34 where the sludge is subjected to water treatment.

The drainage water in the film-water mixing tank 22 and the drain water in the rotary screen 23 are separately transferred to the drainage tank 25 and there, are subjected to water treatment, and the resulting water is to be used as water for retreatment. That is to say, the drain waters of the respective drainage tanks are water-treated in the first and second precipitation tanks 32, 33 according to the coagulation precipitation method, subsequently are passed through a filtration tank, and are circulated to each of the devices as a retreatment water.

The bulk of waste film pieces severed and cut in the crushing step comprises ribbon-like film strips of about 50 mm in width which are aggregated together to form an irregulator bulk or mass and are charged with static electricity, so that they are not easily separated or dissociated. They have complicated deformations set on the film strips and contain various kinds of foreign matter therein and are tenaciously attached to impurities and mud on the film surfaces.

According to the conventional method, it was very difficult to completely separate out and remove such extraneous matter. With this invention, however, as soon as the waste film pieces in a block form are introduced into the cleaning solution, they are softened by the liquid temperature, are beaten rapidly by the fluidization of a forced circulation water stream of the heated solution, and are further softened while migrating in the solution. When the waste film pieces are in the state in which their deformation as mentioned above are smoothed out and substantially disappears in this way, they undergo the irradiation of ultrasonic energy, the cleaning or washing effect of which is almost doubled owing to the temperature of the heated cleaning solution. As a consequence, the mud attached on the film surfaces is swiftly separated out in a time of the order of seconds, and is deposited and accumulated on the bottom of the cleaning tank. Greasy contaminants can also be removed by the degreasing action inherent in the ultrasonic energy, and further can be completely removed when a detergent is used in combination.

As will be apparent from the description above, according to the method of this invention, the ultrasonic treatment at the elevated temperature of the cleaning solution not only makes it possible to enhance markedly its cleaning effect, but also assists in beating the block of waste film pieces made of thermoplastic synthetic resin and smoothing them out, thus facilitating the washing of them. It is thus possible to eliminate perfectly the contaminants and foreign matter from the waste film pieces within a short time by the synergistic effect. Moreover, there is attained the subsidiary effect that miscellaneous fungi attached to the film can be sterilized simultaneously by the ultrasonic wave irradiation.

The film pieces thus withdrawn and delivered from the separation step of extraneous matter are purified so clearly that no further washing is required and they no longer impair nor wear mechanical parts such as the screw of a hydro-extractor at the subsequent hydro-extraction step. Therefore, the treatment ability is improved and a fluff product is finally obtained that can be maintained at high level of quality.

The invention will be further apparent from the following non-limitative example.

EXAMPLE

Separation of foreign matter from a waste film of polyvinyl chloride was performed by the use of the apparatus as shown in FIGS. 1 to 4 comprising a cleaning tank of 1 m wide, 4 m long and 1 m deep.

Warm water was filled into the cleaning tank, 1.5 l of a commercial alkaline detergent was added thereto and the resulting cleaning solution was circulated with running of the stirrer by jetting it from the jet nozzles. When the solution reached 45° C., 20 Kg of the block material of waste polyvinyl chloride film crushed pieces was introduced into the tank and was irradiated with 30 KHz of ultrasonic wave to conduct cleaning for 3 minutes. The block of waste film pieces prior to the introduction in the tank contained 47.1%, based on the weight of the film, of foreign matter such as soil, sand, etc. wheres the amount of the foreign matter that remained after the cleaning was reduced to 0.4%, and accordingly, the proportion of it removed was 99.2%.

In order to evaluate or represent quantitatively the cleaning effect attained by the invention apparatus, the spectroscopic transmissivity of the film was measured. The measurements were made at a wavelength of 660 m$\mu$ at which light is dispersed because the rate of light transmittance with the film was observed to be stable and almost the same in the range of from visible region to infrared region up to 0.5$\mu$. In general, the value of the spectroscopic transmittance varies largely depending upon the state of the film. For instance, where a film is wet or has specks or folds on its surface, its light transmittance is reduced. When the foregoing polyvinyl chloride waste film was measured with respect to the rate of light transmittance and the results obtained were computed in terms of the cleaning rate, it was confirmed that the film as a raw material prior to the treatment had a rate of transmittance of 40% which is calculated to be a cleaning rate of 45% whereas the rate of transmittance of the film after subjecting to ultrasonic cleaning for about 60 seconds was 95-96%. Here, the light transmittance of the waste film tested is calculated in terms of the cleaning rate based on a new film whose measured transmittance is assumed to correspond to a cleaning rate of 100%.

For comparison purposes, cleaning was also conducted using a conventional aeration stream type of extraneous matter-separating tank under similar conditions to the conditions above except that liquid was stirred by the aeration by means of three pipes for blowing air provided on the bottom of the tank. As a result, the proportion of elimination of extraneous matter according to that method was 96.2% and its cleaning rate calculated based on its transmittance was 70-73%.

Similarly another ultrasonic cleaning method was also conducted, but not in the way of this invention in which cleaning is conducted by a forced circulation stream for an increased residence time. Its cleaning rate calculated from its transmittance measured was 83-85%, thus making a sharp contrast to the ultrasonic cleaning method according to this invention.

As thus far described, the advantages achieved with this invention consist particularly in that with ultrasonic cleaning by the use of water type cleaning tank, it is capable of exhibiting more than a 3-fold treatment capacity as compared with a conventional ultrasonic cleaning method and of enhancing its efficiency of cleaning ability; the installation area of the apparatus required is about one half that of the conventional apparatus. Since from the viewpoint of energy the majority of the cleaning is caused by the ultrasonic energy, the electric power used for it can be much reduced as compared with the conventional system and thus, energy saving in the electric power can be attained.

It is to be noticed that as far as the film thus cleaned and washed is concerned, a much higher purity of product is obtainable with a much less amount of foreign matter remaining in comparison with the conventional system because of the fluidization by the forced circulation stream in the cleaning tank and the subsequent purification, and it is reusable or can be recycled effectively for a wide variety of articles. Therefore, this invention is highly promising in precluding public nuisance caused by the conventional disposal method of a waste film, such as reclamation of land or incineration.

Moreover, according to this invention, the entirety of the drain water produced upon cleaning can be treated by a coagulative precipitation system and then is reused by circulation, so that the drainage water eventually drained out into public drainage basin is little, thus little affecting adversely the public drainage basin.

Thus, the quality of a waste film of synthetic resin can be enhanced and maintained; ultrasonic cleaning ensures action upon the waste film with the aid of the increase in the residence time in the cleaning tank due to the circulation and migration of stream and the subsequent purificatory washing; and the invention is very useful for recycling waste film made of various kinds of thermoplastics as well as polyvinyl chloride. Accordingly, the invention contributes to improvement in the technology of recycling and future practical use of it is promising.

What is claimed is:

1. A method of cleaning soiled, thermoplastic resin, waste film, which comprises the steps of cutting a mass of said soiled, thermoplastic resin, waste film to provide a mass of pieces of said waste film, which pieces are deformed and contain soil distributed thereon and adhering thereto; feeding said mass of pieces onto one end of the upper surface of an elongated, mesh conveyor which conveyor is disposed within a washing tank filled with heated aqueous cleaning liquid and is moving substantially horizontally therein whereby said pieces are immersed in said liquid, simultaneously supplying a first quantity of said liquid from outside said tank into said tank adjacent to said one end of said conveyor and forcibly directing said heated aqueous cleaning liquid in said tank in a direction lengthwise of said conveyor from said one end thereof toward the opposite end thereof whereby said liquid assists said conveyor in moving said pieces toward the opposite end of said conveyor, simultaneously directing into said tank jets of a second quantity of said liquid supplied from outside said tank, said jets being located above the upper surface of said conveyor close to but upstream of the opposite end of said conveyor, said jets being directed above the upper surface of said conveyor in a direction lengthwise of and opposite to the direction of movement of said conveyor, and simultaneously applying ultrasonic energy to said liquid from positions located longitudinally of said conveyor between said jets and said one end of said conveyor, said positions being opposed to each other and being located on opposite lateral sides of and above the upper surface of said conveyor so that said ultrasonic energy is directed laterally inwardly and across the upper surface of said conveyor substantially at right angles to the direction of movement thereof, said liquid being at a temperature sufficient to soften said pieces and to remove soil therefrom while said pieces are being subjected to said ultrasonic energy so as to be beaten thereby, to smooth the deformations thereof and to assist in removing soil therefrom; discharging said pieces from said tank at the opposite end of said conveyor and then washing said pieces with pressurized water.

2. A method as claimed in claim 1 wherein said liquid in said tank is at a temperature of from 40° to 45° C.

3. A method as claimed in claim 1 or claim 2 wherein said film is a polyvinyl chloride film.

4. A method as claimed in claim 1 including the steps of draining said liquid from said pieces at a location downstream from said jets; collecting said liquid in a drainage tank; pumping a portion of said liquid from said drainage tank and supplying it to said washing tank adjacent to said one end of said conveyor as said first quantity of said liquid; and pumping another portion of said liquid from said drainage tank and supplying it to jet nozzles to provide said jets of said second quantity of said liquid.

5. A method as claimed in claim 1 or claim 4 in which the soil on said pieces flows downwardly to the bottom of said washing tank and including the step of removing said soil from the bottom of said washing tank.

6. A method as claimed in claim 1 in which said mass of pieces is deposited onto said upper surface of said conveyor from a location above said one end of said conveyor, said first quantity of said liquid being supplied into a zone in said tank, which zone is upstream of said one end of said conveyor and is separated therefrom by a baffle and including the step of impelling the liquid from said zone around said baffle and in a direction toward the opposite end of said conveyor.

7. A method as claimed in claim 1 in which said ultrasonic energy is applied at at least two longitudinally spaced-apart zones in a direction lengthwise of said conveyor.

* * * * *